(12) United States Patent
Kobashi et al.

(10) Patent No.: US 10,125,707 B2
(45) Date of Patent: Nov. 13, 2018

(54) CONTROL APPARATUS FOR EXHAUST GAS PURIFICATION SYSTEM

(71) Applicant: TOYOTA JIDOSHA KABUSHIKI KAISHA, Toyota-shi, Aichi-ken (JP)

(72) Inventors: Noriyasu Kobashi, Machida (JP); Takashi Tsunooka, Gotemba (JP); Takayuki Otsuka, Susono (JP); Hiromasa Hashimoto, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/578,449

(22) PCT Filed: Jun. 1, 2016

(86) PCT No.: PCT/JP2016/066304
§ 371 (c)(1),
(2) Date: Nov. 30, 2017

(87) PCT Pub. No.: WO2016/194984
PCT Pub. Date: Dec. 8, 2016

(65) Prior Publication Data
US 2018/0149102 A1    May 31, 2018

(30) Foreign Application Priority Data

Jun. 2, 2015  (JP) ................................ 2015-112598
May 19, 2016 (JP) ................................ 2016-100561

(51) Int. Cl.
*F02D 41/02* (2006.01)
*F01N 3/02* (2006.01)
(Continued)

(52) U.S. Cl.
CPC ........... *F02D 41/029* (2013.01); *F01N 3/023* (2013.01); *F01N 9/002* (2013.01);
(Continued)

(58) Field of Classification Search
CPC .... F02D 41/00; F02D 41/0007; F02D 41/029; F02D 41/30; F02D 41/3005; F01N 3/023;
(Continued)

(56) References Cited

U.S. PATENT DOCUMENTS 6,405,528 B1     6/2002  Christen et al.
2008/0155964 A1* 7/2008  Kilkenny ................ F01N 9/002
                                                      60/286

(Continued)

FOREIGN PATENT DOCUMENTS

JP          2008-57443        3/2008

*Primary Examiner* — John Kwon
*Assistant Examiner* — Johnny H Hoang
(74) *Attorney, Agent, or Firm* — Finnegan, Henderson, Farabow, Garrett & Dunner, LLP

(57) ABSTRACT

In the present invention, a first regeneration process is executed as a process for oxidizing and removing PM accumulated on the particulate filter if a measured value of a differential pressure sensor is not more than a predetermined upper limit value, assuming that the measured value of the differential pressure sensor is a value to be provided in a state in which only PM is accumulated on the particulate filter, when a difference between an estimated PM accumulation amount estimated from an operation history of an internal combustion engine and a PM accumulation amount calculated from the measured value of the differential pressure sensor is not less than a predetermined threshold value, while a second regeneration process is executed without executing the first regeneration process if the measured value is larger than the predetermined upper limit value.

4 Claims, 8 Drawing Sheets

(51) Int. Cl.
*F01N 3/023* (2006.01)
*F02D 41/30* (2006.01)
*F01N 9/00* (2006.01)
*F02D 41/26* (2006.01)

(52) U.S. Cl.
CPC ...... *F02D 41/3005* (2013.01); *F01N 2560/08* (2013.01); *F01N 2900/1406* (2013.01); *F01N 2900/1606* (2013.01); *F01N 2900/1611* (2013.01); *F02D 41/26* (2013.01)

(58) Field of Classification Search
CPC ...... F01N 3/0233; F01N 3/025; F01N 3/0253; F01N 3/035; F01N 3/038; F01N 3/2093; F01N 3/0821; F01N 3/0892; F01N 3/2882; F01N 2430/02; F01N 2430/06; F01N 2430/08; F01N 2430/085; F01N 2430/10; F01N 2550/00; F01N 2550/04; F01N 2550/12; F01N 2900/16; F01N 2900/1606; F01N 2560/002; F01N 2560/005; F01N 2560/007; F01N 11/00; F01N 11/002; F01N 11/005
USPC ...... 701/103, 106, 107, 109, 111, 114, 115; 123/434–436, 672, 676, 559.1, 559.2; 60/274–278, 285, 286, 295–299, 311
See application file for complete search history.

(56) References Cited

U.S. PATENT DOCUMENTS

| | | | |
|---|---|---|---|
| 2009/0222189 A1* | 9/2009 | Books | F01N 3/0842 701/102 |
| 2010/0229538 A1* | 9/2010 | Bloms | F01N 3/0256 60/295 |
| 2011/0146248 A1* | 6/2011 | Charles | F01N 3/0256 60/295 |
| 2011/0162620 A1* | 7/2011 | Bidner | F02D 41/0025 123/299 |
| 2012/0288410 A1* | 11/2012 | Takayanagi | F01N 9/002 422/105 |
| 2013/0000282 A1* | 1/2013 | Takayanagi | B01D 46/0086 60/295 |
| 2014/0290223 A1* | 10/2014 | Kubo | F01N 9/002 60/286 |
| 2015/0000257 A1* | 1/2015 | Yu | F01N 3/023 60/295 |
| 2015/0252699 A1* | 9/2015 | Catalogna | F01N 3/023 60/274 |
| 2015/0275738 A1* | 10/2015 | Van Nieuwstadt | B01D 46/0086 73/114.76 |
| 2016/0258331 A1* | 9/2016 | Ricci | F01N 3/208 |
| 2016/0326934 A1* | 11/2016 | Kim | F01N 9/002 |

* cited by examiner

[Fig. 1]
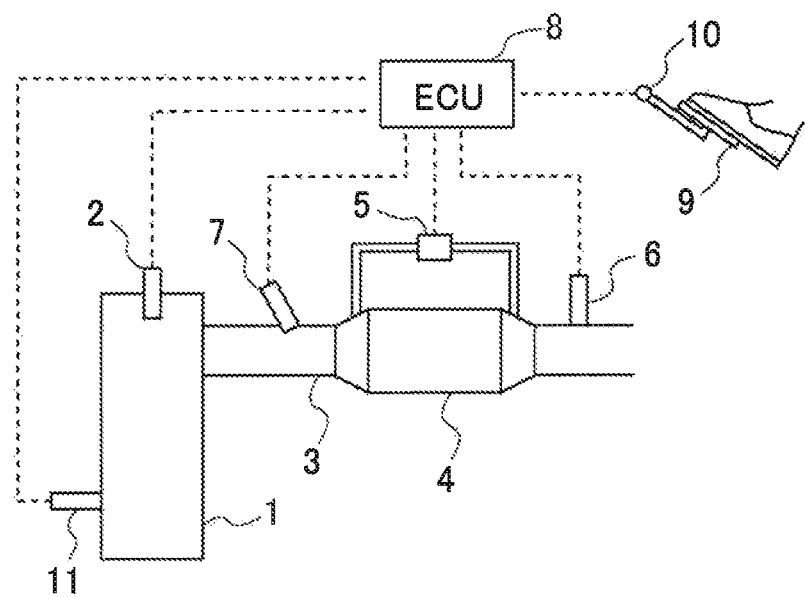

[Fig. 2]
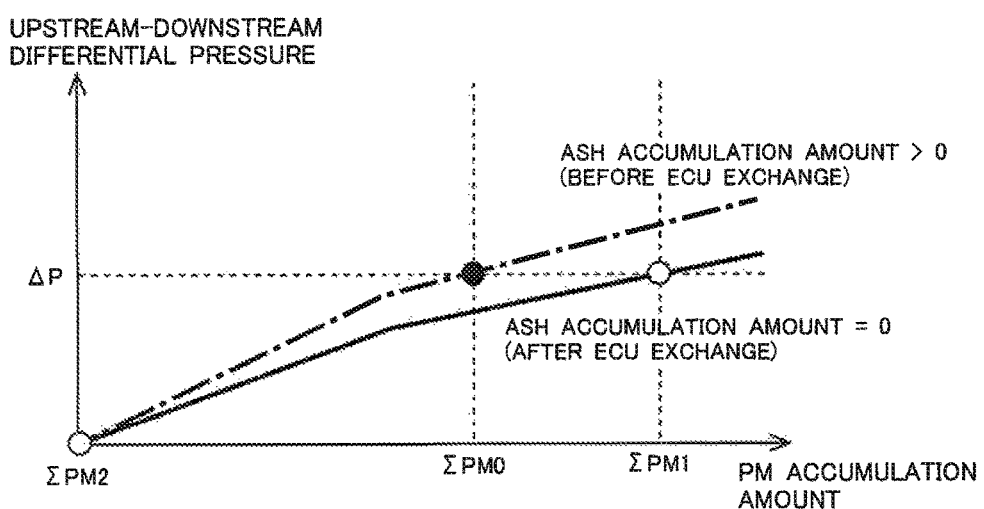

[Fig. 3]
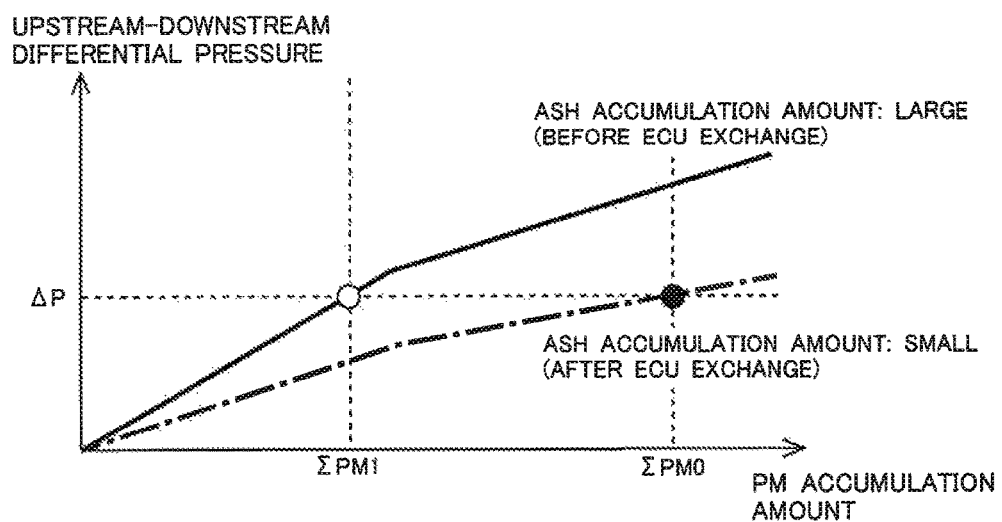

[Fig. 4]
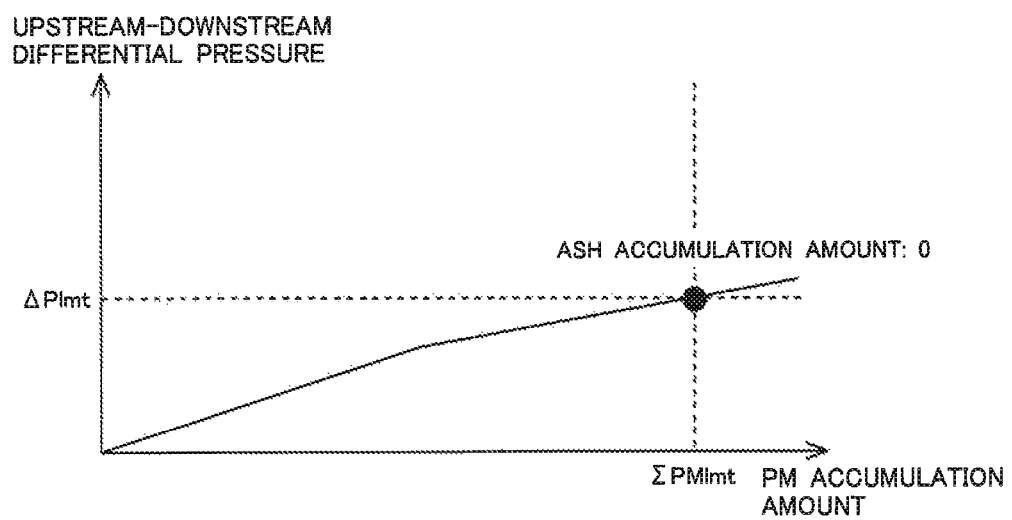

[Fig. 5]
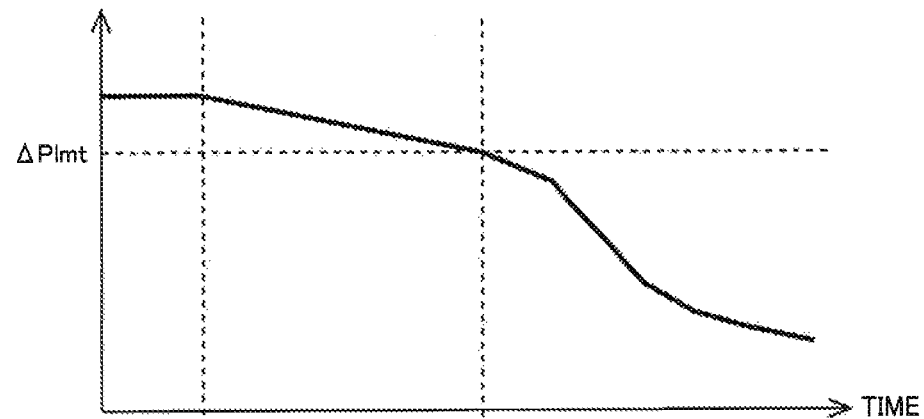
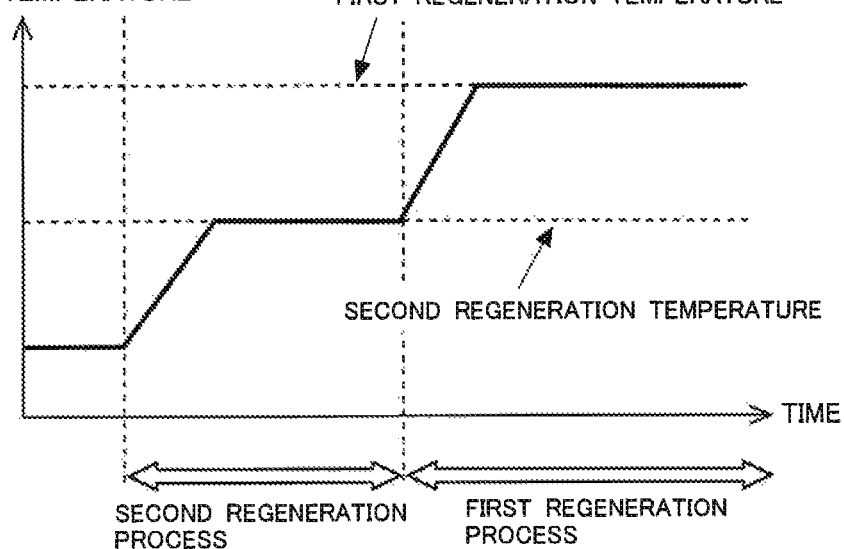

[Fig. 6]
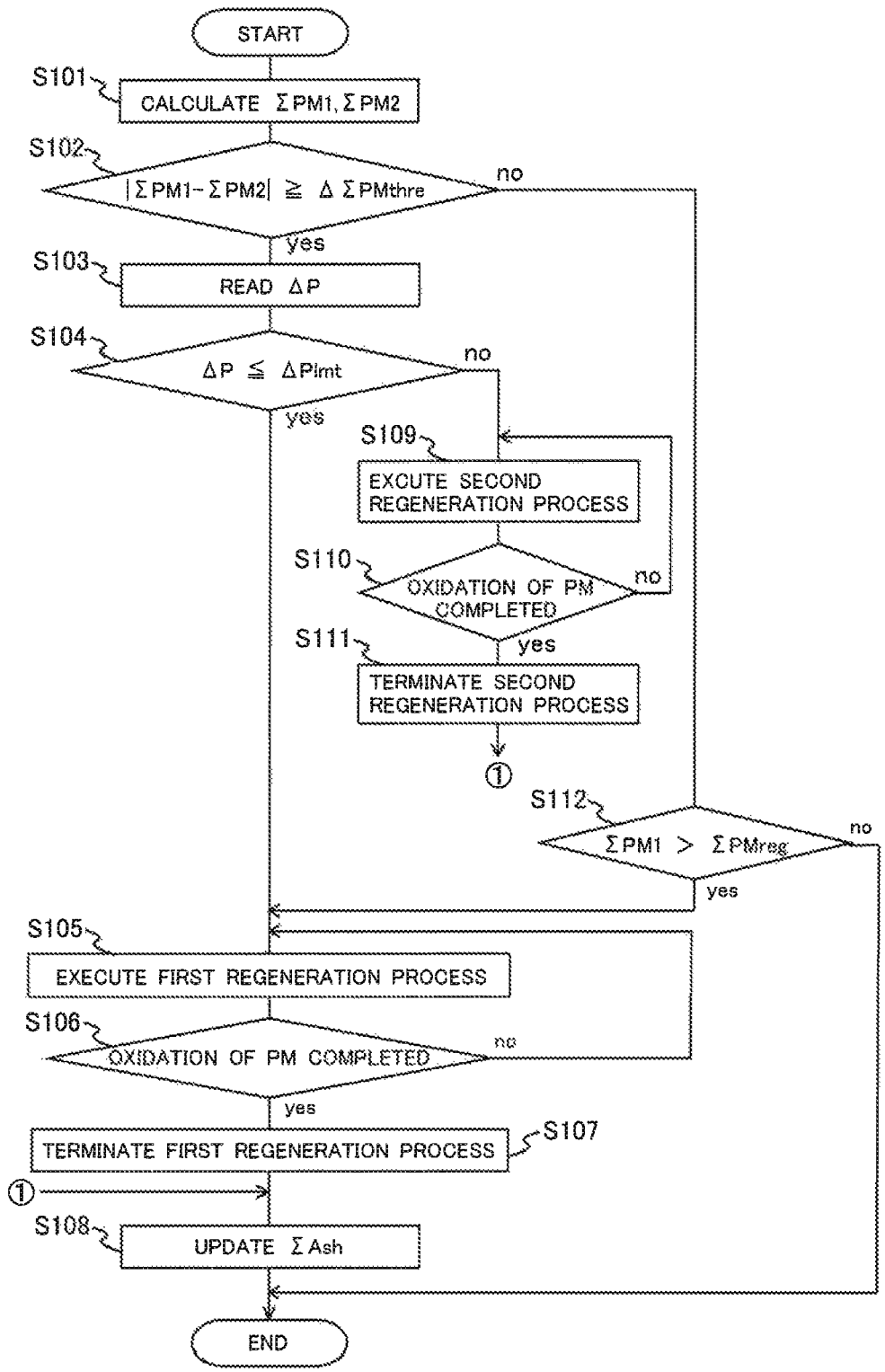

[Fig. 7]
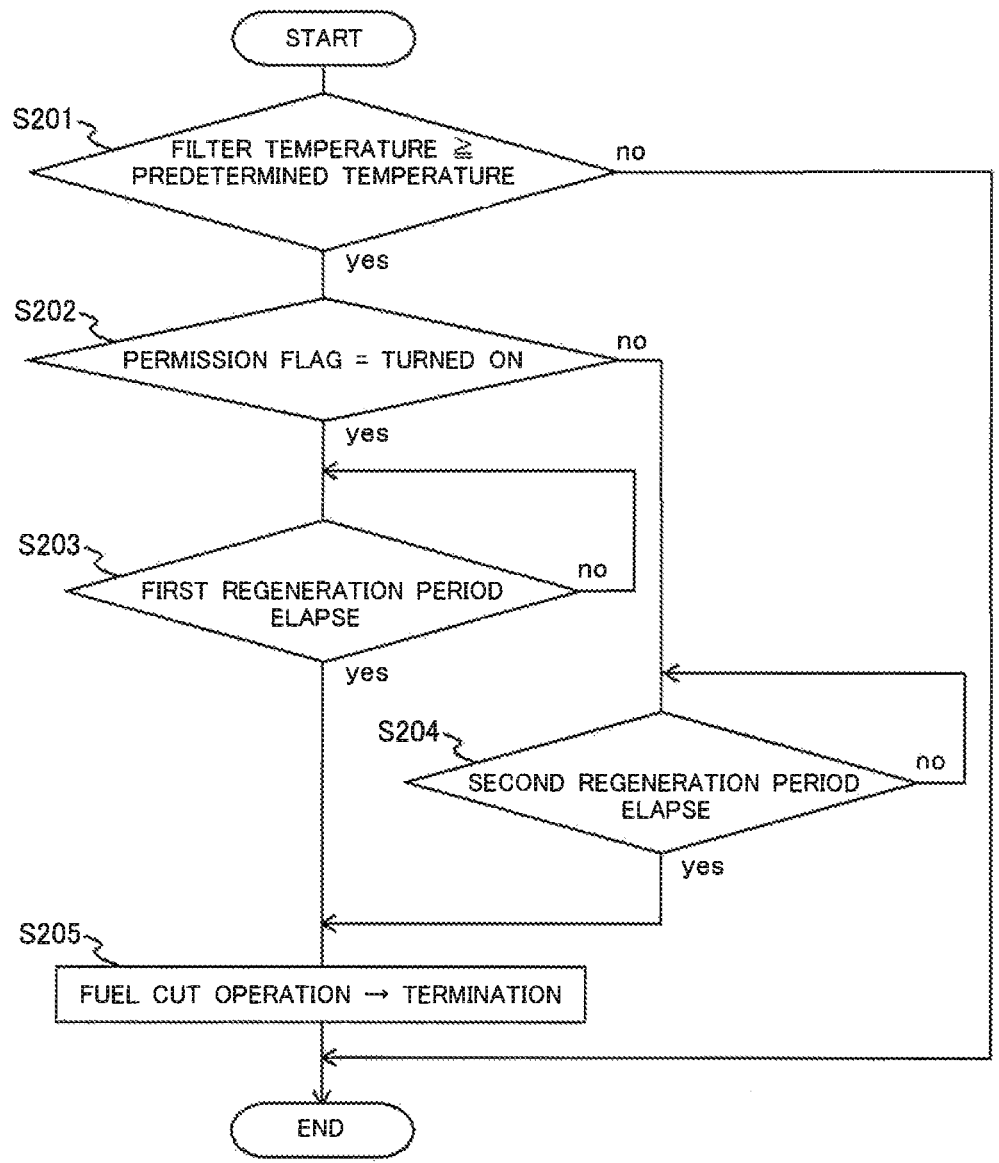

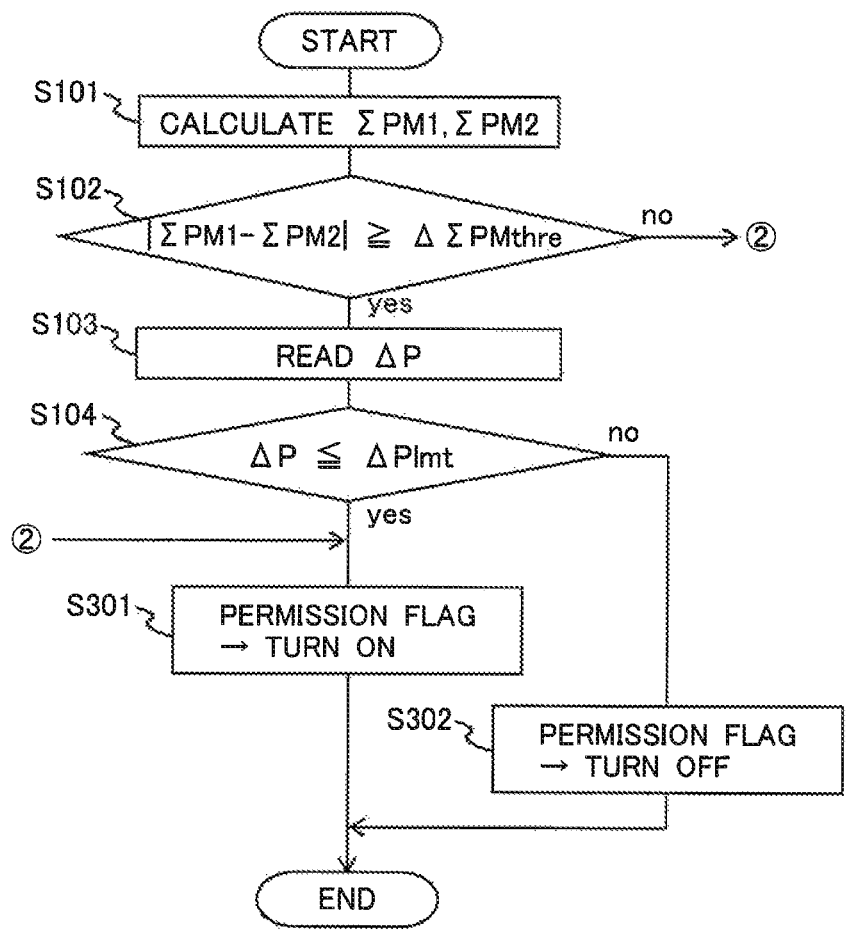
[Fig. 8]

CONTROL APPARATUS FOR EXHAUST GAS PURIFICATION SYSTEM

TECHNICAL FIELD

The present invention relates to a control apparatus for an exhaust gas purification system. In particular, the present invention relates to a control apparatus which is applicable to an exhaust gas purification system provided with a particulate filter arranged in an exhaust passage of an internal combustion engine.

BACKGROUND ART

Such a technique is known in relation to an exhaust gas purification system having a particulate filter arranged in an exhaust passage of an internal combustion engine that the PM (Particulate Matter) accumulation amount and the ash accumulation amount of the particulate filter are calculated on the basis of, for example, the operation history of the internal combustion engine, and a filter regeneration process is executed in order to oxidize and remove PM collected by the particulate filter if the PM accumulation amount arrives at a certain threshold value (see, for example, Patent Literature 1).

CITATION LIST

Patent Literatures

Patent Literature 1: Japanese Patent Application Laid-Open No. 2008-057443
Patent Literature 2: U.S. Pat. No. 6,405,528

SUMMARY OF THE INVENTION

Technical Problem

In the meantime, there is a possibility that a control apparatus (for example, ECU: Electric Control Unit) for calculating the PM accumulation amount and the ash accumulation amount of the particulate filter may be exchanged and/or the particulate filter may be exchanged in the middle of the use of a vehicle which carries the exhaust gas purification system as described above. If the control apparatus is exchanged, there is a possibility that the PM accumulation amount and the ash accumulation amount, which are calculated by a control apparatus after the exchange, may be deviated from the actual PM accumulation amount and the actual ash accumulation amount. For example, when the control apparatus is exchanged, a state arises such that the ash accumulation amount and the PM accumulation amount, which are retained by the control apparatus after the exchange, are reset to zero. On this account, if the control apparatus is exchanged in a state in which PM and ash are accumulated on the particulate filter, there is a possibility that the PM accumulation amount, which is calculated by the control apparatus after the exchange, may be deviated from the actual PM accumulation amount of the particulate filter.

Further, when the particulate filter is exchanged, there is also a possibility that the PM accumulation amount and the ash accumulation amount, which are calculated by the control apparatus, may be deviated from the actual PM accumulation amount and the actual ash accumulation amount of the particulate filter after the exchange. For example, when the particulate filter is exchanged, there is a possibility that the ash accumulation amount, which is retained by the control apparatus, may be different from the amount of ash which is accumulated on the particulate filter after the exchange. As a result, there is a possibility that the PM accumulation amount, which is calculated on the basis of the ash accumulation amount retained by the control apparatus, may be deviated from the actual PM accumulation amount of the particulate filter.

As described above, if the PM accumulation amount and the ash accumulation amount, which are calculated by the control apparatus, are deviated from the actual PM accumulation amount and the actual ash accumulation amount, there is a possibility that the filter regeneration process may be executed in a state in which the actual PM accumulation amount is excessively large. In such a situation, it is feared that the temperature of the particulate filter may be excessively raised during the execution of the filter regeneration process.

The present invention has been made taking the foregoing actual circumstances into consideration, an object of which is to provide a technique which makes it possible to suppress a filter regeneration process from being executed in a state in which there is a possibility that any excessive increase in temperature of a particulate filter may be caused, if the PM accumulation amount calculated by a control apparatus is deviated from the actual PM accumulation amount of the particulate filter, as resulting, for example, from the exchange of the control apparatus and/or the particulate filter.

Solution to Problem

In the present invention, in order to solve the problems as described above, if the deviation, which is not less than a predetermined threshold value, appears between the estimated PM accumulation amount estimated from an operation history of an internal combustion engine and the PM accumulation amount calculated from a measured value of a differential pressure sensor, then it is assumed that the measured value of the differential pressure sensor is a value to be provided in a state in which only PM is accumulated on a particulate filter, and a first regeneration process, which is a process for oxidizing and removing PM accumulated on the particulate filter, is executed if the measured value is not more than a predetermined upper limit value, while a second regeneration process is executed without executing the first regeneration process if the measured value is larger than the predetermined upper limit value.

In particular, the control apparatus for the exhaust gas purification system according to the present invention resides in a control apparatus applicable to an exhaust gas purification system including a particulate filter which is arranged in an exhaust passage of an internal combustion engine; and a differential pressure sensor which measures an upstream-downstream differential pressure as a difference between an exhaust gas pressure provided upstream from the particulate filter and an exhaust gas pressure provided downstream from the particulate filter. Then, the control apparatus comprises first calculater configured to calculate an ash accumulation amount as an amount of ash accumulated on the particulate filter on the basis of an operation history of the internal combustion engine; second calculater configured to calculate a PM accumulation amount as an amount of PM accumulated on the particulate filter on the basis of a measured value of the differential pressure sensor and the ash accumulation amount calculated by the first calculater; estimater configured to estimate an estimated PM accumulation amount as an estimated value of the amount of PM accumulated on the particulate filter on the basis of the operation history of the internal combustion engine; and controller configured to execute a first regeneration process as a process for oxidizing and removing PM accumulated on the particulate filter by raising a temperature of the particulate filter to a predetermined first regeneration temperature if the measured value of the differential pressure sensor is not more than a predetermined upper limit value when a difference between the PM accumulation amount calculated by the second calculater and the estimated PM accumulation amount estimated by the estimater is not less than a predetermined threshold value and which executes a second regeneration process as a process for raising the temperature of the particulate filter to a second regeneration temperature as a temperature which is lower than the predetermined first regeneration temperature and which makes it possible to oxidize PM without executing the first regeneration process if the measured value of the differential pressure sensor is larger than the predetermined upper limit value.

Note that the "predetermined threshold value" referred to herein is the value at which it is considered that if the difference between the PM accumulation amount calculated by the second calculater and the estimated PM accumulation amount estimated by the estimater is not less than the predetermined threshold value, then at least one of the PM accumulation amount calculated by the second calculater and the PM accumulation amount estimated by the estimater is deviated from the actual PM accumulation amount, and there is a possibility that the excessive increase in temperature of the particulate filter may be caused if the first regeneration process is executed in this state. The "predetermined threshold value" is previously determined by means of an adaptation operation by utilizing, for example, an experiment. Further, the "predetermined upper limit value" is the upstream-downstream differential pressure at which it is considered that only PM is accumulated on the particulate filter, and the temperature of the particulate filter is not excessively raised if the first regeneration process is executed when the upstream-downstream differential pressure of the particulate filter is not more than the predetermined upper limit value. In other words, the "predetermined upper limit value" is the maximum upstream-downstream differential pressure at which the first regeneration process can be performed while suppressing the excessive increase in temperature of the particulate filter even in the case of a state in which only PM is accumulated on the particulate filter if the upstream-downstream differential pressure of the particulate filter is not more than the predetermined upper limit value. The "predetermined upper limit value" is previously determined experimentally. Note that the upstream-downstream differential pressure of the particulate filter changes depending on the flow rate of the exhaust gas passing through the particulate filter. Accordingly, the predetermined upper limit value may be changed so that the predetermined upper limit value is the value corresponding to the exhaust gas flow rate provided at the point in time at which the differential pressure sensor measures the upstream-downstream differential pressure of the particulate filter. Further, it is also appropriate to correct the measured value of the differential pressure sensor instead of changing the predetermined upper limit value.

If the deviation arises between the ash accumulation amount calculated by the first calculater and the actual ash accumulation amount resulting, for example, from the exchange of the control apparatus or the particulate filter, there is a possibility that at least one of the PM accumulation amount calculated by the second calculater and the PM accumulation amount estimated by the estimater may be different from the actual PM accumulation amount. In the state as described above, if it is judged whether or not the first regeneration process can be executed on the basis of the PM accumulation amount calculated by the second calculater or the PM accumulation amount estimated by the estimater, there is a possibility that the first regeneration process may be performed in a state in which the actual PM accumulation amount is excessively small or the first regeneration process may be executed in a state in which the actual PM accumulation amount is excessively large. In this context, if the first regeneration process is performed in the state in which the actual PM accumulation amount is excessively small, there is little possibility that the temperature of the particulate filter may be excessively raised. However, if the first regeneration process is performed in the state in which the actual PM accumulation amount is excessively large, there is much possibility that the temperature of the particulate filter may be excessively raised. Therefore, it is necessary to avoid such a situation that the first regeneration process is executed in the state in which the actual PM accumulation amount is excessively large.

In relation thereto, in the case of the control apparatus for the exhaust gas purification system according to the present invention, if the difference between the PM accumulation amount calculated by the second calculater and the estimated PM accumulation amount estimated by the estimater is not less than the predetermined threshold value, it is judged whether or not the first regeneration process can be executed, while assuming such a state that the largest amount of PM is collected by the particulate filter. In particular, in the case of the control apparatus for the exhaust gas purification system according to the present invention, if the difference between the PM accumulation amount calculated by the second calculater and the estimated PM accumulation amount estimated by the estimater is not less than the predetermined threshold value, it is assumed that any ash is not accumulated on the particulate filter, and only PM is accumulated thereon. On the assumption as described above, it is possible to regard that the measured value of the differential pressure sensor correlates with the amount of PM accumulated on the particulate filter.

In this context, when it is regarded that the measured value of the differential pressure sensor indicates the upstream-downstream differential pressure provided in the state in which only PM is accumulated on the particulate filter, if the PM accumulation amount, which correlates with the measured value, is defined as "maximum PM accumulation amount", then the maximum PM accumulation amount is the amount which is not less than the actual PM accumulation amount and which is estimated to be somewhat larger. Then, when it is assumed that only PM is accumulated on the particulate filter and the upstream-downstream differential pressure of the particulate filter is equal to the predetermined upper limit value, if the PM accumulation amount, which correlates with the predetermined upper limit value, is defined as "limit PM accumulation amount", then the actual PM accumulation amount, which is provided when the measured value of the differential pressure sensor is not more than the predetermined upper limit value (when the maximum PM accumulation amount is not more than the limit PM accumulation amount), is not more than the limit PM accumulation amount. As described above, the limit PM accumulation amount (predetermined upper limit value), which is provided in this situation, is the maximum value of the PM accumulation amount (upstream-downstream differential pressure) at which the first regeneration process can be performed without excessively raising the temperature of the particulate filter. Therefore, if the first regeneration process is executed when the actual PM accumulation amount is not more than the limit PM accumulation amount, then it is possible to oxidize and remove PM collected by the particulate filter, while suppressing the excessive increase in temperature of the particulate filter. On the other hand, if the measured value of the differential pressure sensor is larger than the predetermined upper limit value (if the maximum PM accumulation amount is larger than the limit PM accumulation amount), there is a possibility that the actual PM accumulation amount may be larger than the limit PM accumulation amount. Therefore, if the first regeneration process is executed in the state as described above, there is a possibility that the temperature of the particulate filter may be excessively raised. However, in the case of the control apparatus for the exhaust gas purification system according to the present invention, the first regeneration process is not executed if the measured value of the differential pressure sensor is larger than the predetermined upper limit value. Therefore, it is possible to avoid the excessive increase in temperature of the particulate filter.

Note that in the control apparatus for the exhaust gas purification system according to the present invention, the controller may calculate the maximum PM accumulation amount from the measured value of the differential pressure sensor, if the difference between the PM accumulation amount calculated by the second calculater and the estimated PM accumulation amount estimated by the estimater is not less than the predetermined threshold value. In this case, the controller may execute the first regeneration process if the maximum PM accumulation amount is not more than the limit PM accumulation amount. The controller may not execute the first regeneration process if the maximum PM accumulation amount is larger than the limit PM accumulation amount. When the control apparatus is constructed as described above, it is thereby possible to obtain an effect which is the same as or equivalent to that of a method in which the measured value of the differential pressure sensor is compared with the predetermined upper limit value.

In the meantime, when the difference between the PM accumulation amount calculated by the second calculater and the estimated PM accumulation amount estimated by the estimater is not less than the predetermined threshold value, and the measured value of the differential pressure sensor is larger than the predetermined upper limit value, if the state, in which the first regeneration process is not executed, is continued, then there is a possibility that the pressure loss of the particulate filter may be excessively increased, and the state, in which it is impossible to grasp the correct PM accumulation amount of the particulate filter, is continued. On this account, when the difference between the PM accumulation amount calculated by the second calculater and the estimated PM accumulation amount estimated by the estimater is not less than the predetermined threshold value, and the measured value of the differential pressure sensor is larger than the predetermined upper limit value, then it is desirable that PM accumulated on the particulate filter is oxidized and removed by means of any method which is different from the first regeneration process described above.

In view of the above, when the difference between the PM accumulation amount calculated by the second calculater and the estimated PM accumulation amount estimated by the estimater is not less than the predetermined threshold value, and the measured value of the differential pressure sensor is larger than the predetermined upper limit value, then the controller executes the second regeneration process as the process for raising the temperature of the particulate filter to the second regeneration temperature as the temperature which is lower than the predetermined first regeneration temperature and which makes it possible to oxidize PM. When the second regeneration process is executed as described above, the amount of PM oxidized per unit time on the particulate filter can be suppressed to be small, as compared with when the first regeneration process is executed. Therefore, it is possible to oxidize and remove PM accumulated on the particulate filter, while suppressing the excessive increase in temperature of the particulate filter. Note that if the measured value of the differential pressure sensor is lowered to be not more than the predetermined upper limit value on account of the execution of the second regeneration process, it is also appropriate to switch the process from the second regeneration process to the first regeneration process.

Further, in the case of the exhaust gas purification system in which the first regeneration process is performed as such a process that PM accumulated on the particulate filter is oxidized and removed by executing a fuel cut operation for a predetermined first regeneration period if a fuel cut operation request is generated for the internal combustion engine; the controller may execute the second regeneration process by means of such a method that the fuel cut operation is executed for a second regeneration period which is shorter than the first regeneration period if the difference between the PM accumulation amount calculated by the second calculater and the estimated PM accumulation amount estimated by the estimater is not less than the predetermined threshold value and the measured value of the differential pressure sensor is larger than the predetermined upper limit value when the fuel cut operation request is generated for the internal combustion engine. According to the control apparatus constructed as described above, the fuel cut operation period is shortened when the second regeneration process is executed as compared with when the first regeneration process is executed. Therefore, the amount of PM, which is oxidized on the particulate filter during the fuel cut operation period, can be suppressed to be small. As a result, it is possible to oxidize and remove PM accumulated on the particulate filter, while suppressing the excessive increase in temperature of the particulate filter.

Further, the controller may obtain the actual ash accumulation amount on the basis of the measured value of the differential pressure sensor provided when the first regeneration process is terminated. Then, the controller may correct the ash accumulation amount calculated by the first calculater on the basis of the actual ash accumulation amount. When the ash accumulation amount is updated as described above, the discrepancy between the calculated value of the ash accumulation amount and the actual ash accumulation amount, which results from the exchange of the control apparatus or the particulate filter, can be dissolved. As a result, it is also possible to dissolve the discrepancy between the PM accumulation amount calculated by the second calculater and the actual PM accumulation amount.

Advantageous Effects of Invention

According to the present invention, it is possible to suppress the first filter regeneration process from being executed in a state in which there is a possibility that any excessive increase in temperature of the particulate filter may be caused, if the PM accumulation amount calculated by the control apparatus is deviated from the actual PM accumulation amount of the particulate filter, as resulting, for example, from the exchange of the control apparatus and/or the particulate filter.

BRIEF DESCRIPTION OF DRAWINGS

FIG. 1 shows a schematic arrangement of an internal combustion engine and an exhaust system thereof to which the present invention is applied.

FIG. 2 shows a relationship among the actual PM accumulation amount $\Sigma PM0$, the PM accumulation amount $\Sigma PM1$ determined from the measured value of a differential pressure sensor, and the PM accumulation amount $\Sigma PM2$ estimated from the operation history of the internal combustion engine when ECU is exchanged.

FIG. 3 shows a relationship among the actual PM accumulation amount $\Sigma PM0$, the PM accumulation amount $\Sigma PM1$ determined from the measured value of the differential pressure sensor, and the PM accumulation amount $\Sigma PM2$ estimated from the operation history of the internal combustion engine when a particulate filter is exchanged.

FIG. 4 shows exemplary setting of the predetermined upper limit value $\Delta Plmt$.

FIG. 5 shows timing charts illustrating a method for executing the second regeneration process.

FIG. 6 shows a flow chart illustrating a process routine executed by ECU when PM collected by the particulate filter is oxidized and removed.

FIG. 7 shows a flow chart illustrating a process routine executed by ECU when PM collected by the particulate filter is oxidized and removed in another embodiment.

FIG. 8 shows a flow chart illustrating a process routine executed by ECU when turn-on and turn-off of a permission flag are switched.

DESCRIPTION OF EMBODIMENTS

An explanation will be made below on the basis of the drawings about a specified embodiment of the present invention. For example, the dimension or size, the material, the shape, and the relative arrangement of each of constitutive parts or components described in the embodiment of the present invention are not intended to limit the technical scope of the invention only thereto unless specifically noted.

FIG. 1 shows a schematic arrangement of an internal combustion engine and an exhaust system thereof to which the present invention is applied. The internal combustion engine 1 shown in FIG. 1 is an internal combustion engine (diesel engine) of the compression ignition type provided with a plurality of cylinders. The internal combustion engine 1 is provided with a fuel injection valve 2 for injecting the fuel into the unillustrated cylinder. Further, an exhaust pipe 3, which has a passage for allowing the gas (exhaust gas) subjected to the combustion in the cylinder to flow therethrough, is connected to the internal combustion engine 1. A filter casing 4 is arranged at an intermediate position of the exhaust pipe 3. The filter casing 4 includes a particulate filter which is accommodated in a cylindrical casing. The particulate filter is a filter which is provided in order to collect PM contained in the exhaust gas. More specifically, the particulate filter is a wall flow type filter in which passages having upstream ends closed by plugs and passages having downstream ends closed by plugs are alternately arranged. A catalyst having the oxidizing function (for example, a three-way catalyst, a $NO_X$ storage reduction (NSR) catalyst, or an oxidation catalyst, as hereinafter referred to as "oxidation catalyst") is carried on the particulate filter. Note that the oxidation catalyst may be accommodated in a catalyst casing arranged in the exhaust pipe 3 upstream from the filter casing 4.

A differential pressure sensor 5, which measures the difference (upstream-downstream differential pressure) between the exhaust gas pressure upstream from the particulate filter and the exhaust gas pressure downstream from the particulate filter, is attached to the filter casing 4. Note that the differential pressure sensor 5 may be constructed to measure the difference between the pressure in the exhaust pipe 3 upstream from the filter casing 4 and the pressure in the exhaust pipe 3 downstream from the filter casing 4. Alternatively, the upstream-downstream differential pressure may be determined by attaching a pressure sensor for measuring the exhaust gas pressure upstream from the particulate filter and a pressure sensor for measuring the exhaust gas pressure downstream from the particulate filter to the filter casing 4 or the exhaust pipe 3, and calculating the difference therebetween by means of ECU 8 described later on.

An exhaust gas temperature sensor 6, which measures the temperature of the exhaust gas flowing out from the filter casing 4, is attached to the exhaust pipe 3 downstream from the filter casing 4. Further, a fuel addition valve 7, which is provided in order to add the fuel to the exhaust gas flowing through the exhaust pipe 3, is attached to the exhaust pipe 3 upstream from the filter casing 4. Note that when the oxidation catalyst described above is arranged in the exhaust pipe 3 upstream from the filter casing 4, the fuel addition valve 7 is arranged in the exhaust pipe 3 upstream from the oxidation catalyst.

ECU 8, which serves as the control apparatus according to the present invention, is provided in combination with the internal combustion engine 1 constructed as described above. ECU 8 is an electronic control unit including, for example, CPU, ROM, RAM, and backup RAM. ECU 8 is electrically connected to various sensors including, for example, an accelerator position sensor 10 and a crank position sensor 11 in addition to the differential pressure sensor 5 and the exhaust gas temperature sensor 6 described above. The accelerator position sensor 10 is the sensor which measures the operation amount (accelerator opening degree) of an accelerator pedal 9. The crank position sensor 11 is the sensor which measures the rotation position of a crank shaft.

Further, ECU 8 is electrically connected to various apparatuses or devices including, for example, the fuel injection valve 2 and the fuel addition valve 7. ECU 8 controls the various apparatuses or devices on the basis of the measured values of the various sensors described above. For example, ECU 8 calculates the fuel amount (target fuel injection amount) to be injected into the cylinder per one cycle by using the parameters of the measured values of, for example, the accelerator position sensor 10 and the crank position sensor 11. ECU 8 controls the fuel injection valve 2 in accordance with the target fuel injection amount. Further, ECU 8 executes a first regeneration process in order to oxidize and remove PM accumulated on the particulate filter if the PM accumulation amount of the particulate filter exceeds a predetermined regeneration threshold value. The "regeneration threshold value" referred to herein is the amount obtained by subtracting a margin from the maximum value of the PM accumulation amount at which it is possible to execute the first regeneration process without causing the excessive increase in temperature of the particulate filter if the amount of PM actually accumulated on the particulate filter is not more than the predetermined regeneration threshold value.

An explanation will now be made about a procedure for executing the first regeneration process. At first, ECU 8 calculates the PM accumulation amount of the particulate filter on the basis of the measured value of the differential pressure sensor 5 (upstream-downstream differential pressure). There is a correlation between the pressure loss (upstream-downstream differential pressure) of the particulate filter and the PM accumulation amount such that the larger the PM accumulation amount of the particulate filter is, the larger the upstream-downstream differential pressure is. Therefore, if the correlation between the upstream-downstream differential pressure of the particulate filter and the PM accumulation amount is previously determined, it is possible to determine the PM accumulation amount by using the argument of the measured value of the differential pressure sensor 5. However, the upstream-downstream differential pressure of the particulate filter also changes depending on the flow rate of the exhaust gas passing through the particulate filter. Therefore, it is preferable that the correlation among the upstream-downstream differential pressure, the exhaust gas flow rate, and the PM accumulation amount is previously determined, and the PM accumulation amount is determined by using the arguments of the measured value of the differential pressure sensor 5 and the exhaust gas flow rate. The flow rate of the exhaust gas passing through the particulate filter correlates with the sum total of the fuel injection amount and the intake air amount of the internal combustion engine 1. On this account, it is possible to determine the flow rate of the exhaust gas passing through the particulate filter by adding the fuel injection amount and the intake air amount measured by the sensor such as an air flow meter or the like.

Note that there is a possibility that the ash, which is the incombustible substance originating, for example, from the component of the additive contained in the lubricating oil, may be contained in the exhaust gas of the internal combustion engine 1. The ash contained in the exhaust gas is accumulated by being collected by the particulate filter in the same manner as PM. On this account, the upstream-downstream differential pressure of the particulate filter also changes depending on the ash accumulation amount in addition to the PM accumulation amount and the exhaust gas flow rate described above. Therefore, in order to accurately determine the PM accumulation amount of the particulate filter, it is necessary that the total accumulation amount of PM and the ash accumulated on the particulate filter is determined by using the arguments of the measured value of the differential pressure sensor 5 and the exhaust gas flow rate, and the ash accumulation amount is subtracted from the total accumulation amount.

The ash accumulation amount of the particulate filter correlates with the operation history of the internal combustion engine 1 (for example, the cumulated operating time of the internal combustion engine 1, the cumulated travel distance of the vehicle which carries the internal combustion engine 1, or the added-up value of the fuel injection amounts). Therefore, it is possible to determine the ash accumulation amount of the particulate filter on the basis of the operation history of the internal combustion engine 1. Further, it is possible to regard that PM is removed from the particulate filter immediately after the termination of the first regeneration process. Therefore, it is possible to determine the actual ash accumulation amount by using the parameters of the exhaust gas flow rate and the measured value of the differential pressure sensor 5 obtained immediately after the termination of the first regeneration process. Then, it is possible to accurately determine the ash accumulation amount of the particulate filter by correcting the ash accumulation amount determined from the operation history of the internal combustion engine 1 on the basis of the actual ash accumulation amount determined every time when the first regeneration process is executed. Note that ECU 8 determines the ash accumulation amount in accordance with the method described above, and thus the "first calculater" according to the present invention is realized. Further, ECU 8 determines the PM accumulation amount by means of the method in which the ash accumulation amount is subtracted from the total accumulation amount described above, and thus the "second calculater" according to the present invention is realized.

The process, in which the PM accumulation amount is determined by means of the method described above, is repeatedly executed during the operation period of the internal combustion engine 1. Then, if the PM accumulation amount exceeds the predetermined regeneration threshold value, ECU 8 executes the first regeneration process. Specifically, ECU 8 allows the fuel addition valve 7 to add the fuel therefrom into the exhaust gas, and thus the heat of reaction, which is generated when the added fuel is oxidized by the oxidation catalyst, is utilized so that the temperature of the particulate filter is raised to the target temperature (corresponding to the "first regeneration temperature" according to the present invention) at which it is assumed that PM accumulated on the particulate filter is efficiently oxidized. Note that ECU 8 may calculate the temperature of the particulate filter from the measured value of the exhaust gas temperature sensor 6 during the execution of the first regeneration process, and ECU 8 may feedback-control the amount of fuel added from the fuel addition valve 7 so that the calculated value is converged to the target temperature. When the amount of fuel added from the fuel addition valve 7 is feedback-controlled as described above, it is possible to efficiently oxidize and remove PM accumulated on the particulate filter.

Note that the PM accumulation amount of the particulate filter may be estimated on the basis of the operation history of the internal combustion engine 1. For example, ECU 8 calculates the amount of PM (PM emission amount) emitted or discharged from the internal combustion engine 1 per unit time by using the parameters of, for example, the fuel injection amount, the intake air amount, and the number of revolutions of the engine. Then, ECU 8 may add up the PM emission amounts, and the added-up value may be used as the PM accumulation amount of the particulate filter (estimated PM accumulation amount). Further, based on such a viewpoint that PM emitted from the internal combustion engine 1 is collected by the particulate filter at a predetermined proportion, the PM emission amount may be multiplied by a coefficient (hereinafter referred to as "collection coefficient") which corresponds to the predetermined proportion, and the added-up value of the results of multiplying calculation may be used as the estimated PM accumulation amount. The predetermined proportion, which is provided in the situation as described above, may be a fixed value. Alternatively, the predetermined proportion may be a variable value which is changeable depending on the flow rate of the exhaust gas (for example, a value which is more decreased as the flow rate of the exhaust gas is faster). In this way, ECU 8 determines the PM accumulation amount on the basis of the operation history of the internal combustion engine 1, and thus the "estimater" according to the present invention is realized.

In the meantime, there is a possibility that the filter casing 4 or ECU 8 may be exchanged in the middle of the use of the vehicle which carries the internal combustion engine 1. If the filter casing 4 or ECU 8 is exchanged, there is a possibility that the PM accumulation amount, which is determined by ECU 8 after the exchange, may be deviated from the actual PM accumulation amount. For example, if ECU 8 is exchanged, such a state is given that the ash accumulation amount and the PM accumulation amount, which are retained by ECU 8 after the exchange, are reset to zero. On this account, if ECU 8 is exchanged in a state in which PM and the ash are accumulated on the particulate filter, there is a possibility that the PM accumulation amount, which is determined by ECU 8 after the exchange, may be deviated from the actual PM accumulation amount.

In this context, FIG. 2 shows the relationship between the measured value of the differential pressure sensor 5 (upstream-downstream differential pressure) and the PM accumulation amount determined by ECU 8 after the exchange when ECU 8 is exchanged in the state in which PM and the ash are accumulated on the particulate filter. ΣPM0 shown in FIG. 2 indicates the actual PM accumulation amount of the particulate filter. ΣPM1 shown in FIG. 2 indicates the PM accumulation amount (hereinafter referred to as "first PM accumulation amount") which is determined by ECU 8 after the exchange on the basis of the upstream-downstream differential pressure and the ash accumulation amount (zero). ΣPM2 shown in FIG. 2 indicates the estimated PM accumulation amount (hereinafter referred to as "second PM accumulation amount") which is determined by ECU 8 after the exchange on the basis of the operation history of the internal combustion engine 1. Further, the solid line shown in FIG. 2 indicates the correlation between the upstream-downstream differential pressure and the PM accumulation amount as recognized by ECU 8 after the exchange. On the other hand, the alternate long and short dash line shown in FIG. 2 indicates the correlation between the upstream-downstream differential pressure and the actual PM accumulation amount.

When ECU 8 is exchanged, the first PM accumulation amount ΣPM1, which is determined by ECU 8 after the exchange, is determined assuming that the ash accumulation amount is zero. On this account, as shown in FIG. 2, the first PM accumulation amount ΣPM1, which is determined by ECU 8 after the exchange, is larger than the actual PM accumulation amount ΣPM0. Further, the second PM accumulation amount ΣPM2, which is determined by ECU 8 after the exchange, is zero which is smaller than the actual PM accumulation amount ΣPM0. In this way, when ECU 8 is exchange, both of the first PM accumulation amount ΣPM1 and the second PM accumulation amount ΣPM2, which are determined by ECU 8 after the exchange, have the values which are different from the actual PM accumulation amount ΣPM0. Further, the deviation also arises between the first PM accumulation amount ΣPM1 and the second PM accumulation amount ΣPM2 which are determined by ECU 8 after the exchange. In this context, in the example as shown in FIG. 2, if ECU 8 after the exchange judges whether or not the first regeneration process can be executed on the basis of the second PM accumulation amount ΣPM2, there is a possibility that the first regeneration process may be executed in a state in which the actual PM accumulation amount is larger than the predetermined regeneration threshold value. As a result, it is feared that the temperature of the particulate filter may be excessively raised during the execution of the first regeneration process.

Further, if the filter casing 4 is exchanged with a second-hand filter casing 4, the ash accumulation amount retained by ECU 8 is different from the amount of the ash accumulated on the particulate filter after the exchange. For example, if the ash accumulation amount of the particulate filter after the exchange is smaller than the ash accumulation amount of the particulate filter before the exchange, and the PM accumulation amount of the particulate filter after the exchange is larger than the PM accumulation amount of the particulate filter before the exchange, then there is a possibility that the first PM accumulation amount ΣPM1 and the second PM accumulation amount ΣPM2, which are determined by ECU 8, may be smaller than the actual PM accumulation amount.

In this context, FIG. 3 shows the relationship between the measured value of the differential pressure sensor 5 (upstream-downstream differential pressure) and the PM accumulation amount determined by ECU 8 after the exchange of the particulate filter under the condition in which the ash accumulation amount of the particulate filter after the exchange is smaller than the ash accumulation amount of the particulate filter before the exchange and the PM accumulation amount of the particulate filter after the exchange is larger than the PM accumulation amount of the particulate filter before the exchange. The solid line shown in FIG. 3 indicates the correlation between the upstream-downstream differential pressure and the PM accumulation amount of the particulate filter after the exchange as recognized by ECU 8. On the other hand, the alternate long and short dash line shown in FIG. 3 indicates the correlation between the upstream-downstream differential pressure and the actual PM accumulation amount of the particulate filter after the exchange.

When the particulate filter is exchanged, the first PM accumulation amount ΣPM1 determined by ECU 8 is determined assuming that the ash accumulation amount of the particulate filter after the exchange is equal to the ash accumulation amount of the particulate filter before the exchange. Therefore, the first PM accumulation amount ΣPM1, which is determined by ECU 8, is smaller than the actual PM accumulation amount ΣPM0 of the particulate filter after the exchange. Further, the second PM accumulation amount ΣPM2, which is estimated from the operation history of the internal combustion engine 1, is provided as the value which assumes the particulate filter before the exchange. Therefore, the second PM accumulation amount ΣPM2, which is estimated by ECU 8, is also smaller than the actual PM accumulation amount ΣPM0 of the particulate filter after the exchange. Further, the deviation also arises between the first PM accumulation amount ΣPM1 and the second PM accumulation amount ΣPM2. In this context, if it is judged whether or not the first regeneration process can be executed on the basis of the first PM accumulation amount ΣPM1 or the second PM accumulation amount ΣPM2 in the example as shown in FIG. 3, there is a possibility that the first regeneration process may be executed in a state in which the actual PM accumulation amount is larger than the predetermined regeneration threshold value described above. As a result, it is feared that the temperature of the particulate filter may be excessively raised during the execution of the first regeneration process. Note that FIG. 3 shows the example in which the first PM accumulation amount ΣPM1 is smaller than the second PM accumulation amount ΣPM2. However, such a situation may also arise that the first PM accumulation amount ΣPM1 is larger than the second PM accumulation amount $\Sigma PM2$. Even in the case of such a situation, if the first PM accumulation amount $\Sigma PM1$ and the second PM accumulation amount $\Sigma PM2$ are smaller than the actual PM accumulation amount $\Sigma PM0$, a problem, which is the same as or equivalent to that of the example shown in FIG. 3, arises.

Based on the tendency as shown in FIGS. 2 and 3 described above, it is considered that the deviation also arises between the first PM accumulation amount $\Sigma PM1$ and the second PM accumulation amount $\Sigma PM2$ if at least one of the first PM accumulation amount $\Sigma PM1$ and the second PM accumulation amount $\Sigma PM2$ is deviated from the actual PM accumulation amount, resulting, for example, from the exchange of ECU 8 or the particulate filter. Accordingly, in this embodiment, if the deviation of not less than a predetermined threshold value $\Delta\Sigma PMthre$ arises between the first PM accumulation amount $\Sigma PM1$ and the second PM accumulation amount $\Sigma PM2$, it is judged that there is a possibility that at least one of the first PM accumulation amount $\Sigma PM1$ and the second PM accumulation amount $\Sigma PM2$ may be deviated from the actual PM accumulation amount. Then, if it is judged that there is a possibility that at least one of the first PM accumulation amount $\Sigma PM1$ and the second PM accumulation amount $\Sigma PM2$ may be deviated from the actual PM accumulation amount, ECU 8 does not perform the process for judging whether or not the first regeneration process is executed by comparing the regeneration threshold value with any one of the two PM accumulation amounts $\Sigma PM1$, $\Sigma PM2$. That is, in this embodiment, if the deviation of not less than the predetermined threshold value $\Delta\Sigma PMthre$ arises between the first PM accumulation amount $\Sigma PM1$ and the second PM accumulation amount $\Sigma PM2$, it is judged whether or not the first regeneration process is executed by comparing the measured value of the differential pressure sensor 5 and a predetermined upper limit value $\Delta Plmt$.

The "predetermined threshold value $\Delta\Sigma PMthre$" referred to herein is the value at which it is possible to regard that at least one of the first PM accumulation amount $\Sigma PM1$ and the second PM accumulation amount $\Sigma PM2$ is deviated from the actual PM accumulation amount, resulting, for example, from the exchange of ECU 8 or the particulate filter, if the difference $\Delta\Sigma PM$ between the first PM accumulation amount $\Sigma PM1$ and the second PM accumulation amount $\Sigma PM2$ is not less than the predetermined threshold value $\Delta\Sigma PMthre$. Further, the "predetermined threshold value $\Delta\Sigma PMthre$" is the value at which it is considered that there is a possibility that the excessive increase in temperature of the particulate filter may be caused if the first regeneration process is executed in the state as described above. The predetermined threshold value as described above is the value which is previously determined by means of an adaptation operation by utilizing, for example, an experiment. The "predetermined upper limit value $\Delta Plmt$" corresponds to the maximum value of the upstream-downstream differential pressure at which it is possible to perform the first regeneration process while suppressing the excessive increase in temperature of the particulate filter even in the case of such a state that only PM is accumulated on the particulate filter, if the upstream-downstream differential pressure of the particulate filter is not more than the predetermined upper limit value $\Delta Plmt$. Specifically, as shown in FIG. 4, the upstream-downstream differential pressure of the particulate filter, which is provided when the ash accumulation amount of the particulate filter is zero and the PM accumulation amount of the particulate filter is equal to a predetermined limit PM accumulation amount $\Sigma PMlmt$, may be set to the predetermined upper limit value $\Delta Plmt$. The "limit PM accumulation amount" referred to herein is the maximum value of the PM accumulation amount at which it is possible to perform the first regeneration process while suppressing the excessive increase in temperature of the particulate filter on condition that the PM accumulation amount of the particulate filter is not more than the limit PM accumulation amount $\Sigma PMlmt$. The "limit PM accumulation amount" is, for example, the amount which is equal to the regeneration threshold value described above. In the meantime, the upstream-downstream differential pressure of the particulate filter also changes depending on the flow rate of the exhaust gas passing through the particulate filter as described above. Therefore, the predetermined upper limit value $\Delta Plmt$ may be changed depending on the flow rate of the exhaust gas passing through the particulate filter. Alternatively, the measured value of the differential pressure sensor 5 may be corrected depending on the flow rate of the exhaust gas passing through the particulate filter.

In this context, if the measured value of the differential pressure sensor 5 is not more than the predetermined upper limit value $\Delta Plmt$, the PM accumulation amount (maximum-PM accumulation amount), which is determined from the measured value of the differential pressure sensor 5 on the assumption that only PM is accumulated on the particulate filter, is not more than the PM accumulation amount (limit PM accumulation amount) which is provided when only PM is accumulated on the particulate filter and the upstream-downstream differential pressure of the particulate filter is equal to the predetermined upper limit value $\Delta Plmt$. In this context, the maximum PM accumulation amount is the amount which is estimated as a somewhat larger amount that is equivalent to or not less than the actual PM accumulation amount. Therefore, if the maximum PM accumulation amount is not more than the limit PM accumulation amount (the measured value of the differential pressure sensor 5 is not more than the predetermined upper limit value $\Delta Plmt$), the actual PM accumulation amount of the particulate filter is not more than the maximum PM accumulation amount. On this account, it is affirmed that if the measured value of the differential pressure sensor 5 is not more than the predetermined upper limit value $\Delta Plmt$, the first regeneration process can be performed without excessively raising the temperature of the particulate filter. Accordingly, in this embodiment, when the difference between the first PM accumulation amount $\Sigma PM1$ and the second PM accumulation amount $\Sigma PM2$ is not less than the predetermined threshold value $\Delta\Sigma PMthre$, if the measured value of the differential pressure sensor 5 is not more than the predetermined upper limit value $\Delta Plmt$, then the first regeneration process is performed.

On the other hand, when the difference between the first PM accumulation amount $\Sigma PM1$ and the second PM accumulation amount $\Sigma PM2$ is not less than the predetermined threshold value $\Delta\Sigma PMthre$, if the measured value of the differential pressure sensor 5 is larger than the predetermined upper limit value $\Delta Plmt$, then there is a possibility that the actual PM accumulation amount may be larger than the limit PM accumulation amount. If the first regeneration process is executed in the state as described above, there is a possibility that the excessive increase in temperature of the particulate filter may be caused. Accordingly, in this embodiment, when the difference between the first PM accumulation amount $\Sigma PM1$ and the second PM accumulation amount $\Sigma PM2$ is not less than the predetermined threshold value $\Delta\Sigma PMthre$, if the measured value of the differential pressure sensor 5 is larger than the predetermined upper limit value ΔPlmt, then the first regeneration process is not performed.

As described above, when the difference between the first PM accumulation amount ΣPM1 and the second PM accumulation amount ΣPM2 is not less than the predetermined threshold value ΔΣPMthre, if it is judged whether or not the first regeneration process can be executed by means of the method for comparing the measured value of the differential pressure sensor 5 and the predetermined upper limit value ΔPlmt, then the first regeneration process is suppressed from being executed in the state in which there is a possibility that the excessive increase in temperature of the particulate filter may be caused. Note that when the difference between the first PM accumulation amount ΣPM1 and the second PM accumulation amount ΣPM2 is not less than the predetermined threshold value ΔΣPMthre, and the measured value of the differential pressure sensor 5 is larger than the predetermined upper limit value ΔPlmt, if the state, in which the first regeneration process is not executed, is continued, then there is a possibility that the pressure loss of the particulate filter may be excessively increased, and the back pressure of the internal combustion engine 1 may be consequently increased. In view of the above, if the difference between the first PM accumulation amount ΣPM1 and the second PM accumulation amount ΣPM2 is not less than the predetermined threshold value ΔΣPMthre, and the measured value of the differential pressure sensor 5 is larger than the predetermined upper limit value ΔPlmt, then the temperature of the particulate filter is raised to the temperature which is lower than the target temperature during the execution of the first regeneration process wherein PM can be oxidized at that temperature (corresponding to the "second regeneration temperature" according to the present invention). Thus, the process (second regeneration process) is executed, in which PM accumulated on the particulate filter is oxidized and removed while suppressing the amount of PM oxidized per unit time to be small. The second regeneration process as described above may be executed until all of PM accumulated on the particulate filter is oxidized and removed. However, as shown in FIG. 5, the second regeneration process may be executed until the measured value of the differential pressure sensor 5 is lowered to be not more than the predetermined upper limit value ΔPlmt, and then the first regeneration process may be executed by raising the temperature of the particulate filter to the first regeneration temperature. When the second regeneration process and the first regeneration process are executed in combination as described above, the amount of PM accumulated on the particulate filter can be oxidized and removed more quickly, while suppressing the excessive increase in temperature of the particulate filter.

Further, if all of PM accumulated on the particulate filter is oxidized and removed by performing the first regeneration process or the second regeneration process when the difference between the first PM accumulation amount ΣPM1 and the second PM accumulation amount ΣPM2 is not less than the predetermined threshold value ΔΣPMthre, then ECU 8 terminates the first regeneration process or the second regeneration process, and ECU 8 updates the ash accumulation amount retained by ECU 8. In other words, ECU 8 determines the amount of the ash actually accumulated on the particulate filter by using the parameters of the exhaust gas flow rate and the measured value of the differential pressure sensor 5 provided immediately after the termination of the first regeneration process, and ECU 8 corrects the ash accumulation amount retained by ECU 8 on the basis of the actual ash accumulation amount. In this way, if the ash accumulation amount retained by ECU 8 is updated, the first PM accumulation amount ΣPM1 and the second PM accumulation amount ΣPM2, which are determined by ECU 8 after the update, have values approximate to the actual PM accumulation amount. Therefore, even if it is judged whether or not the first regeneration process can be executed by comparing the regeneration threshold value with any one of the first PM accumulation amount ΣPM1 and the second PM accumulation amount ΣPM2, it is possible to perform the first regeneration process while suppressing the excessive increase in temperature of the particulate filter.

An explanation will be made below with reference to FIG. 6 about a procedure for oxidizing and removing PM collected by the particulate filter in the embodiment of the present invention. FIG. 6 shows a flow chart illustrating a process routine executed by ECU 8 when PM collected by the particulate filter is oxidized and removed. The process routine is previously stored in ROM of ECU 8, and the process routine is repeatedly executed by ECU 8 during the operation of the internal combustion engine 1.

In the process routine shown in FIG. 6, ECU 8 firstly performs a process of S101 in which ECU 8 calculates the first PM accumulation amount ΣPM1 from the measured value of the differential pressure sensor 5 and the ash accumulation amount retained by ECU 8. Specifically, ECU 8 determines the total accumulation amount of PM and the ash accumulated on the particulate filter by using the arguments of the measured value of the differential pressure sensor 5 and the exhaust gas flow rate (sum total of the intake air amount and the fuel injection amount) as described above, and ECU 8 calculates the first PM accumulation amount ΣPM1 by subtracting the ash accumulation amount from the total accumulation amount. The ash accumulation amount, which is used for this calculation, has the value which is updated on the basis of the exhaust gas flow rate and the measured value of the differential pressure sensor 5 provided immediately after the previous termination of the first regeneration process or the second regeneration process and which is retained by ECU 8. Further, ECU 8 calculates the second PM accumulation amount ΣPM2 from the operation history of the internal combustion engine 1 in the process of S101. Specifically, ECU 8 calculates the second PM accumulation amount ΣPM2 by adding up the PM emission amounts each of which is calculated by using the parameters of, for example, the fuel injection amount, the intake air amount, and the number of revolutions of the engine as described above. Note that ECU 8 may calculate the second PM accumulation amount ΣPM2 by means of such a method that the PM emission amount is multiplied by the collection coefficient described above, and the obtained calculation results are added up.

In a process of S102, ECU 8 judges whether or not the absolute value of the difference between the first PM accumulation amount ΣPM1 and the second PM accumulation amount ΣPM2 calculated in the process of S101 described above is not less than the predetermined threshold value ΔΣPMthre described above. If the affirmative judgment is made in the process of S102, there is a possibility that at least one of the first PM accumulation amount ΣPM1 and the second PM accumulation amount ΣPM2 is deviated from the actual PM accumulation amount. In such a situation, ECU 8 proceeds to a process of S103.

In the process of S103, ECU 8 reads the measured value of the differential pressure sensor 5 (upstream-downstream differential pressure) ΔP. Subsequently, ECU proceeds to a process of S104 to judge whether or not the upstream-downstream differential pressure ΔP, which is read in the process of S103 described above, is not more than the predetermined upper limit value ΔPlmt described above. If the affirmative judgment is made in the process of S104, it is possible to regard that the amount of PM actually accumulated on the particulate filter is not more than the limit PM accumulation amount ΣPMlmt described above. Therefore, if the upstream-downstream differential pressure ΔP is not more than the predetermined upper limit value ΔPlmt, it is possible to regard that the first regeneration process can be executed without excessively raising the temperature of the particulate filter. Accordingly, ECU 8 proceeds to a process of S105 to execute the first regeneration process. Specifically, ECU 8 allows the fuel addition valve 7 to add the fuel therefrom into the exhaust gas. The fuel, which is added from the fuel addition valve 7, is oxidized by the oxidation catalyst carried on the particulate filter or the oxidation catalyst arranged upstream from the filter casing 4 to generate the heat of reaction. As a result, the particulate filter is heated by the heat of reaction of the added fuel. In this procedure, ECU 8 calculates the temperature of the particulate filter from the measured value of the exhaust gas temperature sensor 6 to feedback-control the amount of the fuel added from the fuel addition valve 7 so that the temperature becomes the first regeneration temperature. When the first regeneration process is executed as described above, PM, which is accumulated on the particulate filter, is oxidized and removed.

After executing the process of S105, ECU 8 proceeds to a process of S106. In the process of S106, ECU 8 judges whether or not all of PM accumulated on the particulate filter is oxidized. Specifically, if the amount of change of the measured value of the differential pressure sensor 5 per unit time is not more than a predetermined judgment value, ECU 8 judges that all of PM accumulated on the particulate filter is oxidized and removed. Note that in another method, it is also allowable to judge whether or not all of PM accumulated on the particulate filter is oxidized and removed by using the parameter of the execution time of the first regeneration process. In other words, the time (required regeneration time), which is required until all of PM accumulated on the particulate filter is oxidized and removed, correlates with the PM accumulation amount provided at the point in time at which the first regeneration process is started. Therefore, if the correlation between the PM accumulation amount and the required regeneration time is previously determined, the required regeneration time, which corresponds to the maximum PM accumulation amount, can be determined from the correlation therebetween. Then, if the execution time of the first regeneration process arrives at the required regeneration time, it may be judged that all of PM accumulated on the particulate filter is oxidized and removed. If the negative judgment is made in the process of S106, then ECU 8 returns to the process of S105, and ECU 8 continuously executes the first regeneration process. On the other hand, if the affirmative judgment is made in the process of S106, ECU 8 proceeds to a process of S107.

In a process of S107, ECU 8 terminates the first regeneration process by stopping the fuel addition from the fuel addition valve 7 into the exhaust gas. Subsequently, ECU 8 proceeds to a process of S108 to update the ash accumulation amount retained by ECU 8. Specifically, ECU 8 reads the measured value of the differential pressure sensor 5 provided immediately after the termination of the first regeneration process, and ECU 8 calculates the flow rate of the exhaust gas (sum total of the intake air amount and the fuel injection amount) passing through the particulate filter at that point in time. Then, ECU 8 calculates the total accumulation amount of PM and the ash accumulated on the particulate filter by using the parameters of the measured value of the differential pressure sensor 5 and the exhaust gas flow rate. Note that it is possible to regard that the PM accumulation amount of the particulate filter is zero immediately after the termination of the first regeneration process. Therefore, it is possible to regard that the total accumulation amount is equal to the actual ash accumulation amount. Thus, ECU 8 regards the total accumulation amount as the actual ash accumulation amount, and ECU 8 updates the value of the ash accumulation amount retained by ECU 8. When the ash accumulation amount retained by ECU 8 is updated as described above, it is possible to enhance the accuracies of the first PM accumulation amount ΣPM1 and the second PM accumulation amount ΣPM2 determined by ECU 8 thereafter.

Note that if the negative judgment is made in the process of S104 described above, there is a possibility that the amount of PM actually accumulated on the particulate filter may be larger than the limit PM accumulation amount ΣPMlmt described above. In other words, if the negative judgment is made in the process of S104 described above, there is a possibility that the temperature of the particulate filter may be excessively raised, resulting from the execution of the first regeneration process. In view of the above, ECU 8 proceeds to a process of S109 to execute the second regeneration process. Specifically, ECU 8 controls the amount of the fuel added from the fuel addition valve 7 so that the temperature of the particulate filter is raised to the second regeneration temperature which is lower than the first regeneration temperature. When the second regeneration process is executed as described above, PM, which is accumulated on the particulate filter, is oxidized and removed. However, the PM oxidation speed (amount of PM oxidized per unit time), which is provided in this situation, is slower than that provided when the first regeneration process is executed. As a result, PM, which is accumulated on the particulate filter, is gradually oxidized. Thus, it is possible to oxidize and remove PM accumulated on the particulate filter, while suppressing the excessive increase in temperature of the particulate filter.

ECU 8 proceeds to a process of S110 after executing the process of S109 described above. In the process of S110, ECU 8 judges whether or not all of PM accumulated on the particulate filter is oxidized. Specifically, ECU 8 judges whether or not all of PM accumulated on the particulate filter is oxidized by using a method which is the same as or equivalent to that of the process of S106 described above. If the negative judgment is made in the process of S110, then ECU 8 returns to the process of S109, and ECU 8 continuously executes the second regeneration process. On the other hand, if the affirmative judgment is made in the process of S110, ECU 8 proceeds to a process of S111.

In the process of S111, ECU 8 terminates the second regeneration process by stopping the fuel addition from the fuel addition valve 7 into the exhaust gas. Then, ECU 8 proceeds to the process of S108 to update the ash accumulation amount retained by ECU 8. Note that if the measured value of the differential pressure sensor 5 (upstream-downstream differential pressure) ΔP is lowered to be not more than the predetermined upper limit value ΔPlmt during the execution of the second regeneration process, ECU 8 may proceed to the first regeneration process from the second regeneration process at that point in time.

Further, if the negative judgment is made in the process of S102 described above, it is possible to regard that the first PM accumulation amount ΣPM1 and the second PM accumulation amount ΣPM2 are not deviated from the actual PM accumulation amount. Therefore, ECU 8 executes the regeneration process as usual. That is, if the negative judgment is made in the process of S102 described above, ECU 8 proceeds to a process of S112 to judge whether or not the first PM accumulation amount ΣPM1 determined in the process of S101 described above is larger than the predetermined regeneration threshold value ΣPMreg described above. If the negative judgment is made in the process of S112, ECU 8 terminates the execution of this process routine. On the other hand, if the affirmative judgment is made in the process of S112, ECU 8 proceeds to the process of S105 to execute the first regeneration process.

ECU 8 executes the process routine shown in FIG. 6 as described above, and thus the "controller" according to the present invention is realized. Therefore, when at least one of the first PM accumulation amount ΣPM1 and the second PM accumulation amount ΣPM2 is deviated from the actual PM accumulation amount, resulting, for example, from the exchange of ECU 8 or the particulate filter, it is possible to oxidize and remove PM accumulated on the particulate filter, without excessively raising the temperature of the particulate filter. Further, the actual ash accumulation amount is determined on the basis of the measured value of the differential pressure sensor 5 provided when all of PM accumulated on the particulate filter is oxidized and removed, and thus it is possible to update the ash accumulation amount retained by ECU 8. Therefore, it is possible to enhance the accuracies of the first PM accumulation amount ΣPM1 and the second PM accumulation amount ΣPM2 determined by ECU 8 thereafter.

<Another Embodiment>

In the embodiment described above, such an example has been described that the present invention is applied to the compression ignition type internal combustion engine (diesel engine). However, the present invention can be also applied to a spark ignition type internal combustion engine (gasoline engine). The exhaust gas temperature of the spark ignition type internal combustion engine is higher than the exhaust gas temperature of the compression ignition type internal combustion engine. Therefore, there are many opportunities to raise the temperature of the particulate filter to a temperature at which PM can be oxidized during the operation period of the spark ignition type internal combustion engine. Therefore, the first regeneration process for the spark ignition type internal combustion engine is performed by means of a method in which the fuel cut operation is executed for a predetermined period (fuel injection is stopped for a predetermined period) when the temperature of the particulate filter is a temperature at which PM can be oxidized and a fuel cut operation request is generated, for example, during the deceleration operation. When the first regeneration process is performed by means of the method as described above, the particulate filter is exposed to an oxidizing atmosphere. Therefore, PM, which is accumulated on the particulate filter, is oxidized and removed. Note that the "predetermined period" referred to herein is such a period that PM, which is accumulated on the particulate filter, can be oxidized and removed without excessively raising the temperature of the particulate filter on condition that the execution period of the fuel cut operation is not more than the predetermined period. The "predetermined period" corresponds to the "first regeneration period" according to the present invention.

In the spark ignition type internal combustion engine in which the first regeneration process is performed by means of the method as described above, when at least one of the first PM accumulation amount ΣPM1 and the second PM accumulation amount ΣPM2 is deviated from the actual PM accumulation amount, resulting, for example, from the exchange of ECU 8 or the particulate filter, the deviation also arises between the first PM accumulation amount ΣPM1 and the second PM accumulation amount ΣPM2, in the same manner as in the case of the compression ignition type internal combustion engine described above. Accordingly, when the difference between the first PM accumulation amount ΣPM1 and the second PM accumulation amount ΣPM2 is not less than the predetermined threshold value ΔΣPMthre, if the measured value of the differential pressure sensor 5 (upstream-downstream differential pressure) ΔP is not more than the predetermined upper limit value ΔPlmt described above, then the first regeneration process based on the method described above may be executed. If the measured value of the differential pressure sensor 5 (upstream-downstream differential pressure) ΔP is larger than the predetermined upper limit value ΔPlmt, the first regeneration process based on the method described above may not be executed. Then, when the difference between the first PM accumulation amount ΣPM1 and the second PM accumulation amount ΣPM2 is not less than the predetermined threshold value ΔΣPMthre, and the measured value of the differential pressure sensor 5 (upstream-downstream differential pressure) ΔP is larger than the predetermined upper limit value ΔPlmt, then the amount of PM, which is oxidized during the fuel cut operation, may be suppressed to be small by executing the second regeneration process by means of a method in which the fuel cut operation is executed for a second regeneration period which is shorter than the first regeneration period. Note that the second regeneration period may be set as follows. That is, the larger the measured value of the differential pressure sensor 5 (upstream-downstream differential pressure) ΔP is, the higher the temperature of the particulate filter is, the shorter the second regeneration period is. When the second regeneration period is decided as described above, it is possible to more reliably suppress the excessive increase in temperature of the particulate filter during the execution of the second regeneration process.

An explanation will now be made on the basis of FIG. 7 about a procedure for oxidizing and removing PM accumulated on the particulate filter in the spark ignition type internal combustion engine. FIG. 7 shows a process routine executed by ECU 8 by using the trigger of the start of the fuel cut operation of the internal combustion engine 1. This process routine is previously stored, for example, in ROM of ECU 8.

In the process routine shown in FIG. 7, ECU 8 firstly performs a process of S201 in which ECU 8 calculates the temperature of the particulate filter from the measured value of the exhaust gas temperature sensor 6 to judge whether or not the temperature is not less than a predetermined temperature. The predetermined temperature referred to herein is the minimum temperature at which PM accumulated on the particulate filter can be oxidized. If the negative judgment is made in the process of S201, ECU 8 terminates the execution of this process routine. On the other hand, if the affirmative judgment is made in the process of S201, ECU 8 proceeds to a process of S202.

In the process of S202, ECU 8 judges whether or not the permission flag is turned ON. The permission flag referred to herein is the flag which is turned ON when the difference between the first PM accumulation amount ΣPM1 and the second PM accumulation amount ΣPM2 is less than the predetermined threshold value ΔΣPMthre and when the difference between the first PM accumulation amount ΣPM1 and the second PM accumulation amount ΣPM2 is not less than the predetermined threshold value ΔΣPMthre and the measured value of the differential pressure sensor 5 (upstream-downstream differential pressure) ΔP is not more than the predetermined upper limit value ΔPlmt. Note that the permission flag is turned OFF when the difference between the first PM accumulation amount ΣPM1 and the second PM accumulation amount ΣPM2 is not less than the predetermined threshold value ΔΣPMthre, and the measured value of the differential pressure sensor 5 (upstream-downstream differential pressure) ΔP is larger than the predetermined upper limit value ΔPlmt. The switching procedure for switching turn-on and turn-off of the permission flag will be described later on.

If the affirmative judgment is made in the process of S202 described above, it is possible to regard that the temperature of the particulate filter is not excessively raised even if the fuel cut operation is executed during the first regeneration period. Accordingly, ECU 8 proceeds to a process of S203 to judge whether or not the first regeneration period elapses after the start of the fuel cut operation. If the negative judgment is made in the process of S203, ECU 8 repeatedly executes the process of S203. On the other hand, if the affirmative judgment is made in the process of S203, ECU 8 proceeds to a process of S205 to terminate the fuel cut operation.

Further, if the negative judgment is made in the process of S202 described above, it is possible to regard that there is a possibility that the temperature of the particulate filter may be excessively raised if the fuel cut operation is executed during the first regeneration period. Accordingly, ECU 8 proceeds to a process of S204 to judge whether or not the second regeneration period elapses after the start of the fuel cut operation. If the negative judgment is made in the process of S204, ECU 8 repeatedly executes the process of S204. On the other hand, if the affirmative judgment is made in the process of S204, ECU 8 proceeds to the process of S205 to terminate the fuel cut operation.

Note that if the fuel cut operation of the internal combustion engine 1 is terminated before the execution of the process of S205 in the middle of the execution of the process routine shown in FIG. 7 described above, ECU 8 terminates the execution of this process routine.

In the next place, an explanation will be made with reference to FIG. 8 about the procedure for switching turn-on and turn-off of the permission flag described above. FIG. 8 shows a flow chart illustrating a process routine executed by ECU 8 when turn-on and turn-off of the permission flag described above are switched. This process routine is previously stored in ROM of ECU 8, and the process routine is repeatedly executed by ECU 8 during the operation period of the internal combustion engine 1. Note that in the process routine shown in FIG. 8, the processes, which are the same as or equivalent to those of the process routine shown in FIG. 6 described above, are designated by the same reference numerals.

In the process routine shown in FIG. 8, the processes of S301 to S302 are executed in place of the processes of S105 to S112 of the process routine shown in FIG. 6 described above. Further, in the process routine of FIG. 6 described above, if the negative judgment is made in the process of S102, the process of S112 is executed. However, in the process routine shown in FIG. 8, if the negative judgment is made in the process of S102, the process of S301 is executed.

In particular, in the process routine shown in FIG. 8, if the negative judgment is made in the process of S102, and if the affirmative judgment is made in the process of S104, then ECU 8 proceeds to the process of S301 to turn ON the permission flag described above. On the other hand, if the negative judgment is made in the process of S104, ECU 8 proceeds to the process of S302 to turn OFF the permission flag described above.

According to the procedure described above, when ECU 8 or the particulate filter is exchanged in the spark ignition type internal combustion engine, it is possible to oxidize and remove PM accumulated on the particulate filter without excessively raising the temperature of the particulate filter. Further, the actual ash accumulation amount is determined on the basis of the measured value of the differential pressure sensor 5 provided when all of PM accumulated on the particulate filter is oxidized and removed, and thus it is also possible to update the ash accumulation amount retained by ECU 8.

REFERENCE SIGNS LIST

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a national phase application of International Application No. PCT/JP2016/066304, filed Jun. 1, 2016, and claims the priority of Japanese Patent Application No. 2015-112598, filed on Jun. 2, 2015, and Japanese Patent Application No. 2016-100561, filed on May 19, 2016, the content of all of which is incorporated herein by reference.

The invention claimed is:

1. A control apparatus for an exhaust gas purification system including: a particulate filter which is arranged in an exhaust passage of an internal combustion engine; and a differential pressure sensor which measures an upstream-downstream differential pressure as a difference between an exhaust gas pressure provided upstream from the particulate filter and an exhaust gas pressure provided downstream from the particulate filter,
wherein the control apparatus comprises a controller including at least one processor configured to:
calculate an ash accumulation amount as an amount of ash accumulated on the particulate filter on the basis of an operation history of the internal combustion engine;
calculate a PM accumulation amount as an amount of PM accumulated on the particulate filter on the basis of a measured value of the differential pressure sensor and the calculated ash accumulation amount;
estimate an estimated PM accumulation amount as an estimated value of the amount of PM accumulated on the particulate filter on the basis of the operation history of the internal combustion engine; and
execute a first regeneration process as a process for oxidizing and removing PM accumulated on the particulate filter by raising a temperature of the particulate filter to a predetermined first regeneration temperature if the measured value of the differential pressure sensor is not more than a predetermined upper limit value when a difference between the calculated PM accumulation amount and the estimated PM accumulation amount is not less than a predetermined threshold value and which executes a second regeneration process as a process for raising the temperature of the particulate filter to a second regeneration temperature as a temperature which is lower than the predetermined first regeneration temperature and which makes it possible to oxidize PM without executing the first regeneration process if the measured value of the differential pressure sensor is larger than the predetermined upper limit value.

2. The control apparatus for the exhaust gas purification system according to claim 1, wherein:
the first regeneration process is such a process that PM accumulated on the particulate filter is oxidized and removed by executing a fuel cut operation for a predetermined first regeneration period if a fuel cut operation request is generated for the internal combustion engine; and
the second regeneration process is such a process that the fuel cut operation is executed for a second regeneration period which is shorter than the first regeneration period if the fuel cut operation request is generated for the internal combustion engine when the measured value of the differential pressure sensor is larger than the predetermined upper limit value on condition that the difference between the calculated PM accumulation amount and the estimated PM accumulation amount is not less than the predetermined threshold value.

3. The control apparatus for the exhaust gas purification system according to claim 1, wherein the controller calculates the amount of ash actually accumulated on the particulate filter on the basis of the measured value of the differential pressure sensor provided when the first regeneration process is terminated, and the controller corrects the calculated ash accumulation amount on the basis of the amount of ash.

4. The control apparatus for the exhaust gas purification system according to claim 2, wherein the controller calculates the amount of ash actually accumulated on the particulate filter on the basis of the measured value of the differential pressure sensor provided when the first regeneration process is terminated, and the controller corrects the calculated ash accumulation amount on the basis of the amount of ash.

* * * * *